(12) United States Patent
Jones (10) Patent No.: US 6,256,623 B1
(45) Date of Patent: Jul. 3, 2001

(54) NETWORK SEARCH ACCESS CONSTRUCT FOR ACCESSING WEB-BASED SEARCH SERVICES

(75) Inventor: William P. Jones, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/102,430

(22) Filed: Jun. 22, 1998

(51) Int. Cl.$^7$ ............................................. G06F 17/30
(52) U.S. Cl. ............................ 707/3; 707/6; 707/10; 707/102; 707/104
(58) Field of Search .................. 707/9, 10, 102, 707/501, 516, 523, 3, 6, 104; 395/200.55, 200.64; 345/327

(56) References Cited

U.S. PATENT DOCUMENTS

| | | | |
|---|---|---|---|
| 5,819,271 | * | 10/1998 | Mahoney et al. ................ 707/9 |
| 5,832,496 | * | 11/1998 | Anand et al. .................... 707/102 |
| 5,835,087 | * | 11/1998 | Herz et al. ....................... 345/327 |
| 5,835,712 | * | 11/1998 | DuFresne ......................... 395/200.55 |
| 5,890,171 | * | 3/1999 | Blumer et al. ................... 707/501 |
| 5,898,833 | * | 4/1999 | Kidder ............................. 395/200.64 |
| 5,940,843 | * | 8/1999 | Zucknovich et al. ............ 707/516 |
| 5,956,716 | * | 9/1999 | Kenner et al. ................... 707/10 |
| 6,025,837 | * | 2/2000 | Matthews, III et al. ......... 345/327 |
| 6,029,182 | * | 2/2000 | Nehab et al. .................... 707/523 |
| 6,185,573 | * | 2/2001 | Angelucci et al. .............. 707/104 |

OTHER PUBLICATIONS

Lim et al., "Extracting structures of HTML documents", IEEE, Jan. 23, 1998, pp. 420–426.*

* cited by examiner

Primary Examiner—Wayne Amsbury
Assistant Examiner—Thuy N. Pardo
(74) Attorney, Agent, or Firm—Woodcock Washburn Kurtz Mackiewicz & Norris (57) ABSTRACT

Search clips are segments of information which provide a consistent user interface and a consistent set of rules for searching varying web-based search services. Search clips are searchable (i.e. they can be accessed with a keyword search) and are displayed "in-place" on a web page. The keywords are compared to tags identifying search clips for web-based search services. A list of hypertext links related to the keyword is displayed within a frame on the same web page. The list which is displayed in place includes hypertext links to applicable search clips, predefined topic lists, and conventional web sites where the search clips are placed at the top of the list. Information is displayed in place. Search criteria entered in a search clip are translated based on a predetermined set of search rules and any requirements of the pre-existing web-based search service that will execute the search. A template is provided which allows services to quickly define search clips such that they all have uniform characteristics.

21 Claims, 5 Drawing Sheets

NETWORK SEARCH ACCESS CONSTRUCT FOR ACCESSING WEB-BASED SEARCH SERVICES

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

FIELD OF THE INVENTION

The present invention relates generally to searching for information on networks and more specifically to a computerized system for and method of accessing information from web-based search services.

BACKGROUND

The World Wide Web provides a computer user access to information in the form of web pages. A web page is a document available on the World Wide Web (the "web"). Every web page is identified by a unique address referred to as a uniform resource locator (URL). A web browser is a software application used to locate and display web pages. One such browser is Microsoft's Internet Explorer. To locate a web page with a browser, the user must know the URL for the page. If the user does not know the URL or just wants to find information on a particular topic, the user uses a search engine.

A search engine is a utility that will search the Internet, an Intranet, a site, or a database for terms that you select. Search engines consist of multiple elements. A first element is a program that roams the area to be searched, collecting data and links to more data. These are variously known as spiders, worms, crawlers, or other colorful names. A second element is an index of the data collected to enable fast access to terms that you search for. A third element is a search interface—the form in which you enter your search terms and the software behind it that queries the index, retrieves matches, and ranks for relevance and organizes the data for follow-on searches Most search vendors now provide a sidebar or separate section of "Related Sites" or "Try these first" that sometimes includes a text box for entering search criteria. But these boxes are easy to miss, are not highlighted, and vary widely from each other with respect to rules of searching or search user interface. Often users do not even regard these as being provided in response to the user's initial query.

Specialty searches on the Web give users many different styles of search user interface. The style of the search interface differs between specialty search engines even when the search functionality is the same underneath (e.g. in the placement of icons, graphics, edit boxes, submit buttons, etc.) This is confusing to the user and wastes time. In addition, specialty searches follow different rules of searching underneath. Some support phrase search, and some do not. Some make smart use of capitalization (e.g. "Bill Clinton" is a proper noun) and some do not. The effect is that users have to learn and adjust to many different ways of searching.

Pointcast and c/net have text boxes for entering search criteria that take the users to the site of a search provider where results are displayed using a variety of different styles of user interface. Users then have to figure out how to get back to the Pointcast or c/net site.

Search engines are an important method of locating information on the web, however, the results that they return can be unorganized and highly depend upon both the skill of the user in writing queries and upon the types of words used by web page writers, both in what they write for human consumption and what tags they use to attract search engines.

A search service is a web page that provides an underlying search engine, as well as multiple various categories of interest that contain previously found pages related to such categories. Many search services exist on the web to help with tasks rearranging from on-line shopping (such as buying a music compact disc, a book, a good wine, a car or a house) to planning a trip (such as locating airline flights and fares) to locating reference information (such as looking up the meaning of a word or locating safety data on a car.) However, these search services are often difficult to find, difficult to use and different from one another in their rules of searching and user interface.

The rules of searching and syntax used by each search engine varies. Understanding the syntax and search rules for each search engine is an important factor in how successful a users search will be. For example, search engines differ in how they handle truncation, pluralization and capitalization. A keyword of "bikes," "bicycle," "bicycles," or "bike" could all yield different results. Most engines interpret lower case as unspecified, but upper case will match only upper case, but there are exceptions. There is no standard at all for truncation, and worse yet, it is probably different in general and advanced search mode for every engine.

Understanding what each search engine does with the non-standard pluralization, truncation, etc. can be quite important in how successful your searches will be. For example, if you search for "bikes" you won't get "bicycle," "bicycles," or "bike." In this case, it would help to use a search engine that allowed "truncation," that is, one that allowed the search word "bike" to match "bikes" as well. One would then search for "bicycyle OR bike OR cycle" ("bicycle* OR bike* OR cycle*" in Alta Vista). With multiple words, some search engines may logically AND them or OR them. With phrases, typically one puts quotes around a phrase so that each word in the phrase is not searched for separately. One may also check an engine's help file before starting a search. Most engines allow you to type in a few words, and then search for occurrences of these words in their data base. Each one has their own way of deciding how to interpret such a search request, resulting in differing results depending on the search service used.

Each search service differs in their treatment and/or allowance of the following different kinds of search strategies. Typing a few relevant words into the search form. Specifying that words must be in the title of a page. What about specifying that words must be in an URL, or perhaps in a special HTML tag? Can they use all logical operators between words like AND, OR, and NOT, and if so, do you need delimiters? Most engines allow you to type in a few words, and then search for occurrences of these words in their data base. Each search service has their own way of deciding what to do about approximate spellings, plural variations, and truncation. If a user just types words into the "basic search" interface you get from the search engine's main page, you also can get different logical expressions binding the different words together. Excite! actually uses a kind of "fuzzy" logic, searching for the AND of multiple words as well as the OR of the words. Most engines have separate advanced search forms where you can be more specific, and form complex Boolean searches (every one mentioned in this article except Hotbot). Some search tools parse HTML tags, allowing you to look for things specifically as links, or as a title or URL without consideration of the text on the page.

There is a need for a web-based technology that provides easy to use search services and returns highly relevant information in a convenient, noticeable and consistent format. There is a further need for a search engine that provides easy to see access to information contained in databases that are not easily found by existing web crawlers and search engines. There is a need to provide a search mechanism which can bring a vast federation of specialty searches which are housed in databases that are either difficult or impossible to crawl through using conventional crawlers. There is a need for a search user interface that can vary depending upon the specialty search area. At the same time, there is a need to preserve basic elements on the search user interface and underlying search behavior regardless of the specialty search.

SUMMARY OF THE INVENTION

A "search clip" is a segment of information such as an interactive graphic element or a frame displayed by a browser which provides access to web-based search services and content available on a network such as the Internet. A search clip may be thought of as an interactive query template in one embodiment. Search clips provide a consistent user interface and a consistent set of rules for searching varying web-based search services. Search clips are searchable (i.e. they can be accessed with a keyword search). They may also be displayed "in-place" on a web page.

To access a search clip from a web page provided by a host, according to one aspect of the invention, a user specifies a keyword or words related to the information the user wants to obtain. The keywords are compared to tags identifying search clips for web-based search services. A list of hypertext links related to the keyword is displayed within a frame on the same web page. The list includes hypertext links to any of the following: applicable search clips, pre-defined topic lists, and conventional web sites. When the user selects a hypertext link to a specific search clip, the search clip is displayed "in-place" within the frame on the same web page.

The information displayed in a search clip can include labels and fields, for example, as well as dropdown menus, edit boxes, checkboxes or radio buttons which provide a specialized interface based on the type of data in the database to be searched. The information displayed with the search clip is predetermined and is based on the subject matter of the search clip. The user fills in the fields of the search clip or otherwise selects the desired search criteria. The search criteria are translated into commands which are based on a predetermined set of search rules and any requirements of the pre-existing web-based search service that will execute the search. A search is executed on the web-based search service associated with the search clip selected by the user. The results of the search are returned and displayed "in-place" within the frame on the same web page rather than on the web page for a provider of the search service. Search clips provide access from a single web page to a growing number of web-based specialty search services.

According to another aspect of the invention, templates allow a user to specify criteria for a search to be executed by a web-based search service. The templates have a consistent user interface and are indexed by topic. A means for querying the templates in response to keywords specified by a user is provided. The result of each query is a list of templates related to the keywords.

In a further embodiment, a tool or template is provided which allows services to quickly define search clips such that they all have uniform characteristics, making them easy to use. This allows content providers to define search clips related to specialty searches for data that is housed in databases that are either difficult or impossible to crawl through using conventional crawlers. In one embodiment, the search clips so generated will all obey common rules of searching. They will all have the same look and feel in radio buttons, dropdown menus, combo boxes, edit boxes, etc. Further a "Go" button will have roughly the same position in all search clips. A provider logo will have the same dimension and location in all search clips. Search clips will meet common, high standards for response time, reliability and relevance—for a high % of user queries, good relevant results will be returned quickly. Still further, they should all meet common standards for delivery time, support, product reliability and other measures of customer satisfaction.

Search clips provide an organized way to accomplish tasks on the Internet. By specifying a few key words in a search engine, search clips are provided in the list of hits obtained and are likely to highly relate to the information or sites sought. In addition to providing relevant information quickly, they also help keep a user at a search site, commonly referred to as a portal, longer because both the search clip and information retrieved are displayed in line on the portal page. Other services and advertisements of the portal remain visible to the user even when the relevant information is identified. Thus, a user is able to accomplish multiple tasks without leaving the portal site.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. The leading digit(s) of reference numbers appearing in the Figures corresponds to the Figure number, with the exception that the same reference number is used throughout to refer to an identical component which appears in multiple Figures.

The system of the present invention utilizes a type of clip or construct, referred to herein as a "search clip", to provide access to a plurality of network web-based search services. A clip is a segment of information displayed on a web page. A variety of clips can coexist on a single web page.

A "search clip" is a kind of clip with additional behavior to support a specialized search. A search clip provides access to and a user interface (UI) for web-based search services available on the Internet. A search clip may be thought of as an interactive query template in one embodiment. Search clips provide a consistent user interface and a consistent set of rules for searching varying web-based search services. Search clips are searchable (i.e. they can be accessed with a keyword search) and are displayed "in-place" on a web page.

The detailed description of this invention is divided into four sections. The first section provides a general description of a suitable computing environment in which the invention may be implemented. The second section provides an overview of the entities involved in the use and creation of search clips. The third section describes browser based screens utilizing search clips in various phases. This is followed by a functional specification for an example embodiment of the search clip system. A conclusion follows, which includes a summary of the advantages of the present invention.

Computing Environment.

Figure 1:
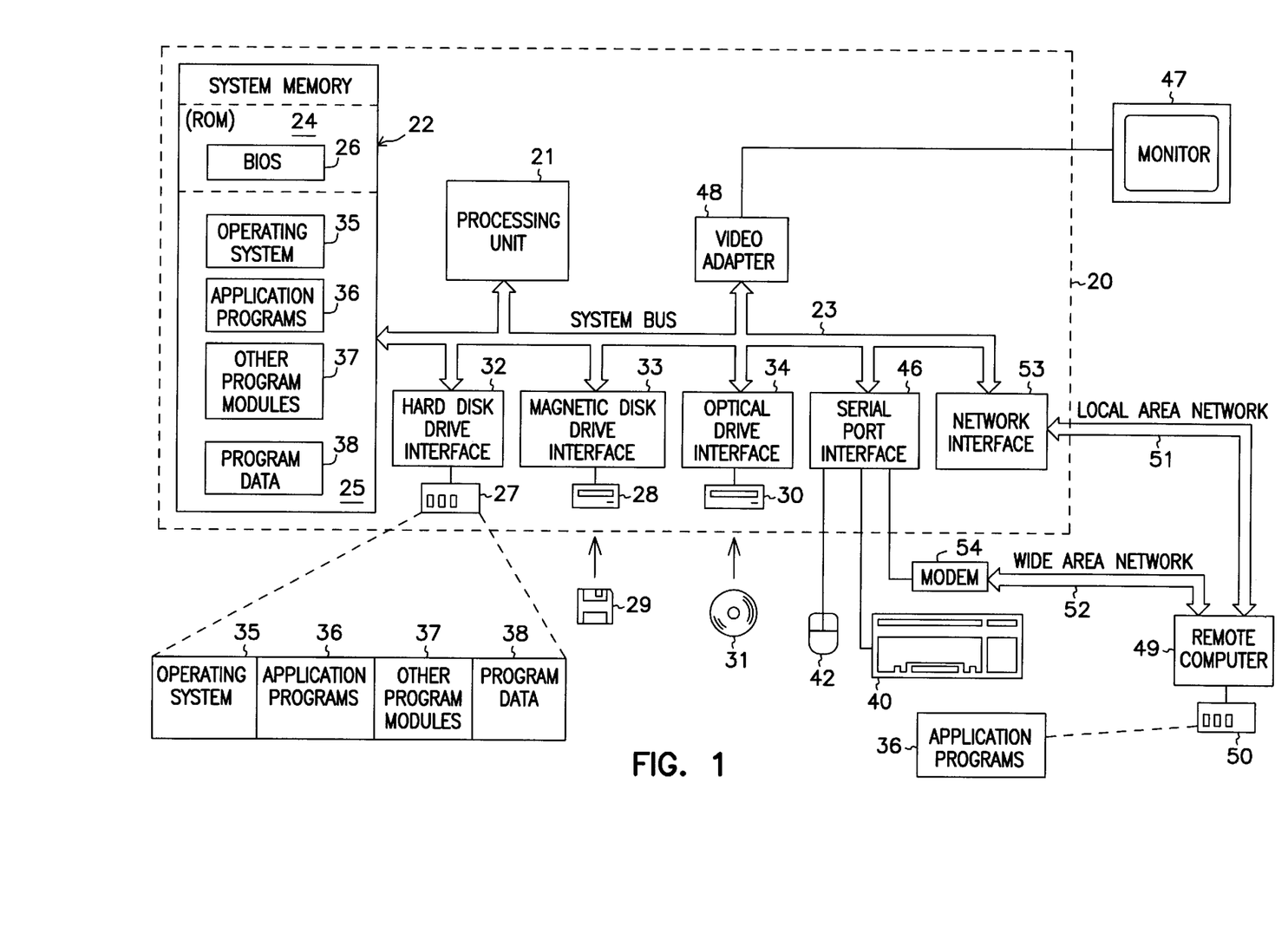
FIG. 1 is an exemplary computer system in which the invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

The application programs 36 of the personal computer 20 include one of any commonly available software applications used to locate and display web pages. In one embodiment, the software application is a web browser displaying graphics and text. In another embodiment, the software application is a web browser also displaying multimedia information including sound and video. Using the web browser, a user accesses the system of the present invention. The system of the present invention provides access to a plurality of search clips.

Figure 2:
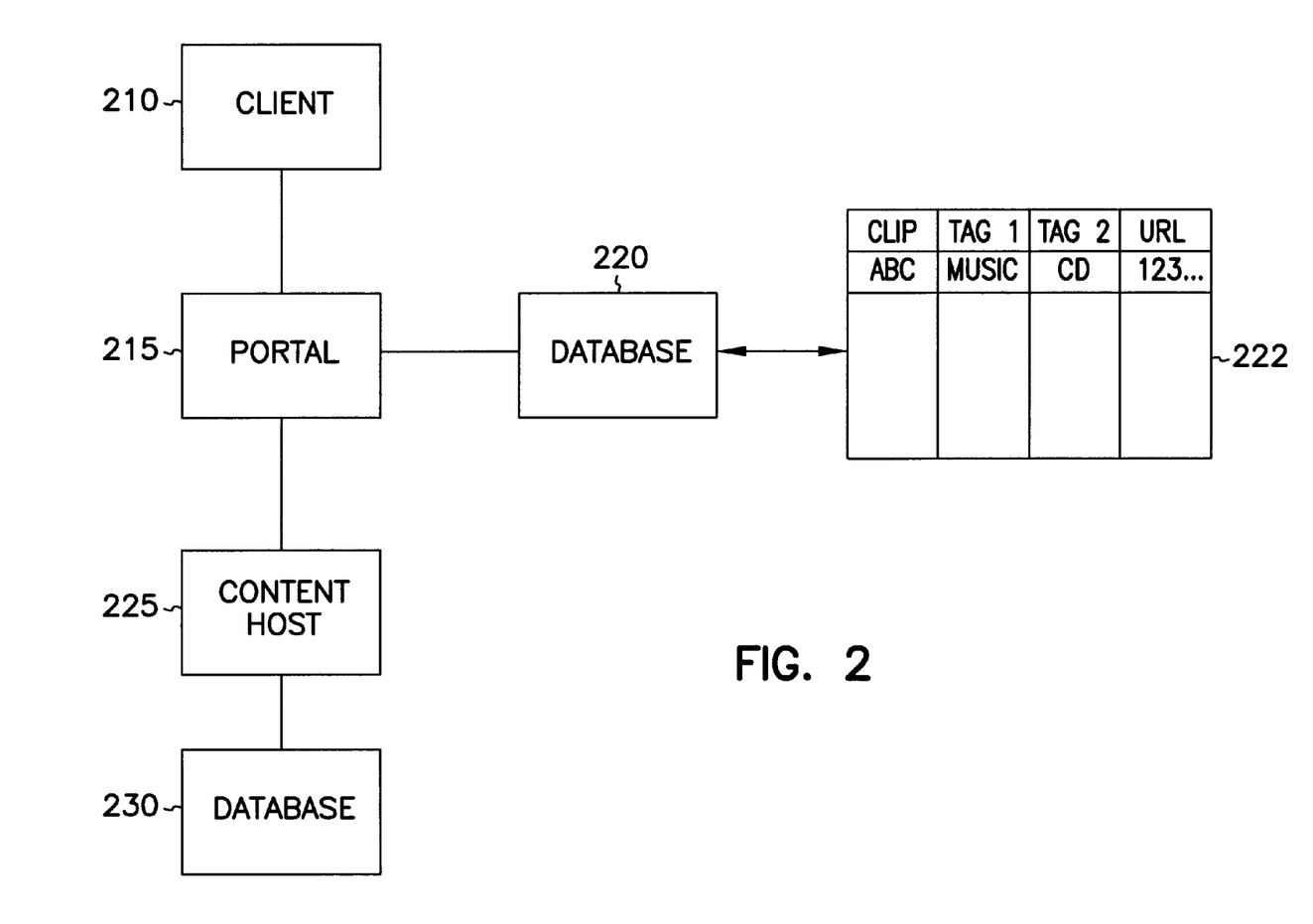
FIG. 2 is a block representation of a computer network showing a client, a portal host, and a content host incorporating the present invention.

In FIG. 2, several computers are shown in a typical Internet based network incorporating the search clips of the present invention. A client 210 is a web client running one of many commonly available software applications used to locate and display web pages. Web pages are meant to describe any type of content that resides on a computer which may be viewable by a client computer. Typically today, the Internet is a networked group of computers which share information stored on them in many different ways. The use of the term Internet and Web are not meant to be limited to the forms in which they currently exist. The invention is applicable to any type of network which has information which may be viewed or transferred between computers. In one embodiment, the software application running on the web client is a web browser displaying graphics and text such as Internet Explorer. In another embodiment, the software application is a web browser also displaying multimedia information including sound and video. The client 210 is coupled through an Internet service provider to a portal host system 215. The portal host system 215 is basically a computer system 20 providing access to a web site which is designed to provide multiple services to a client or user. The portal host system 215

The portal host system 215 is coupled to a database 220 which contains indexed information about content on the web obtained through one or more of several well known methods. In addition, the database 220 contains search clip records or templates as indicated at a table 222. Each search clip record comprises an identifier indicating that it refers to a search clip, one or more tags identifying search words or topics that the clip is related to, and an address or URL which identifies where html based descriptions of the search clip are located. The search clips may also be tagged by concept as opposed to direct keywords. The concept may be a car or auto, that keywords are ultimately mapped to. It should be noted that the actual search clip may be stored on the portal 215, or anywhere it can be retrieved in sufficient time to meet desired performance objectives. The database 220 also comprises a common search engine used to search data contained in database 220, including table 222 and order results obtained as desired. By maintaining control over the database used for search clips, deliberate spamming of content to have it show first in search engines can be controlled.

Database 220 may also contain links to other web sites that have been culled by operators of the portal host 215, which are identified by sets of keywords or tags.

A content host 225 is coupled to the portal 215 and provides searching capabilities for content stored on a database 230, which may be plain storage, or any form of database capable of providing content and being searchable. The content host 225 receives search commands from information entered by a user on the client 210 in a search clip and executes the commands to retrieve desired content or perform other actions as will be seen later.

Figure 3:
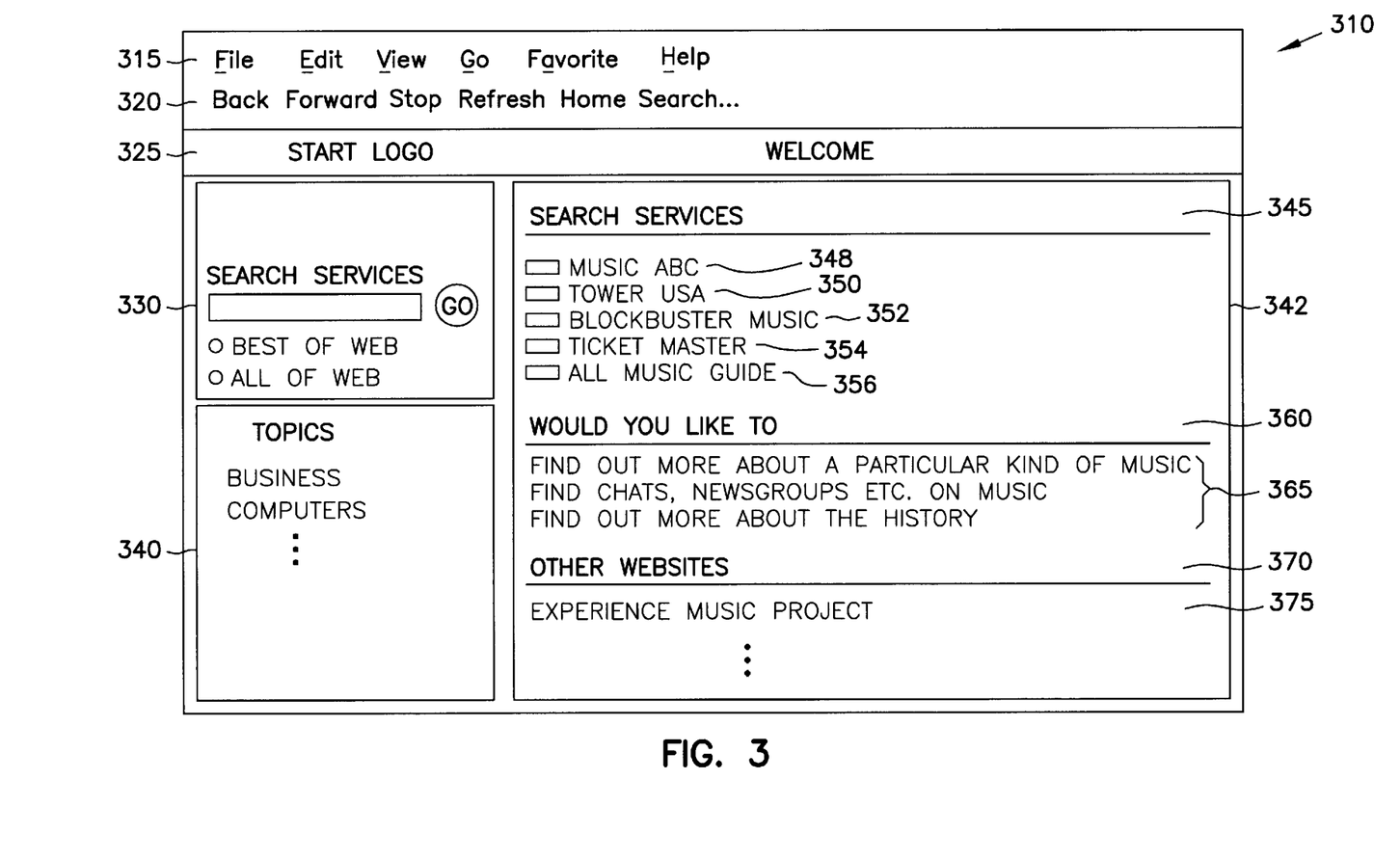
FIG. 3 is a block representation of the portal web page with a frame displaying the results of a keyword search.

FIG. 3 shows a rough block diagram of a portal screen or page 310 of information presented to a user on a client by a portal 215. A page generation module running on portal 215 provides the basic html or other format of tag based language to clients with browsers which generate the screen 310 which is made up of multiple frames. It is desired that the portal page will be specified as the home page on a browser running on the client, or at least on a favorites button. The portal screen comprises the standard operating system command line 315 and browser navigation buttons 320. A logo of the portal is provided at 325 to help obtain brand recognition, and several frames are then provided with different types of links and information. The actual arrangement of the frames and other content of this page may vary as desired. A first frame 330 is a search services frame which provides common search features such as a box for search request entry, some buttons for selecting where to look, such as a best of the web or an all of the web selection, and a button for starting the search labeled "go". In other embodiments, the button for starting the search may have any other desired label, but are used consistently from search clip to search clip to maintain a common UI. Search queries entered by a user on a client in this frame are run against at least database 220, which in addition to search clip records contains links to other websites which are indexed. The links to other websites may be entered and indexed by human interaction or by automated web crawlers.

A second frame comprises a topics frame 340 commonly found on search sites which contains link identifiers related to topics that the providers of portal page determine to most likely be of interest. Some of the topics include Business, Computers & Internet, Education & Reference, Entertainment, Health, Home & Family, Lifestyles & Hobbies, News, People, Sports and Travel. Others may also be provided.

In response to a user entering a few key words, such as "music" or "cd", a list of items is provided in a frame 342. At the start of the list are links to search clips, 348, 350, 352, 354, and 356 with an accompanying logo indicated as a box to the left of the text of each search clip link. These are found in database 220 with reference to table 222. As can be seen in table 222, the first entry is clip ABC corresponding to "Music ABC" a functional entity selected for example only. Both the tags "music" and "cd" were contained in the first record of table 222. While links are shown as being provided, the actual search clips themselves may also be initially displayed in response to the beginning search if desired.

Further down the list 342 is a section of links titled "would you like to" at 360, followed by links 365 to common kinds of things users want to do given the search keywords entered. In response to the keyword music, the portal designers determined that some common things that the user would like to do include finding out more about a particular kind of must, finding chats, newsgroups and other activities related to music, and finding out more about the history of music. Each of these are presented as links, which my lead to predetermined related links. Finally, at 370, a section titled "Other Websites" is provided with a list of links and optionally further descriptive text 375 of such related websites.

Figure 4:
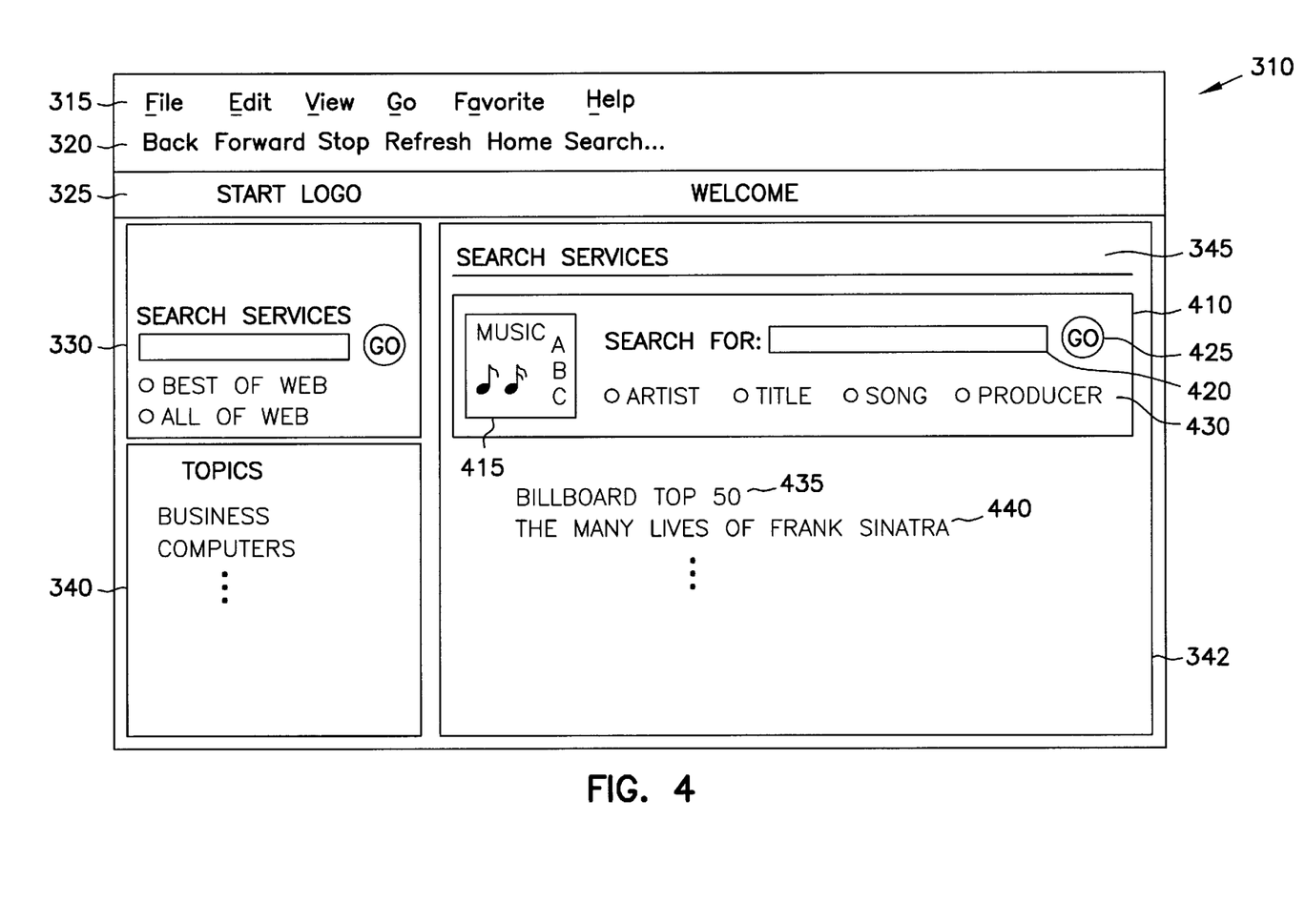
FIG. 4 is a block representation of the portal web page of FIG. 3 with a frame displaying a search clip.

FIG. 4 represents the portal page when a user has selected the Music ABC hyperlink 348 from FIG. 3. An actual Music ABC search clip is now displayed in either a separate frame, a graphic, or a page fragment, all of which are in line with the other search results, or at least displayed on the portal page as represented at 420. The search clip 420 comprises a logo 415 located on the left side of the clip, a search text box or insert box 420, a "go" button 425 located on the right side of the text box, and below the text box, a plurality of buttons 430 for qualifying the search based on artist, title, song and producer. The remainder of frame 342 may be blank, or may contain topics of common interest such as a Billboard Top 50 link 435, and The Many Lives of Frank Sinatra link 440 as well as further related links. Users can return to the original results listing by re-issuing the original search (e.g., "music") in the upper left-hand edit box.

Figure 5:
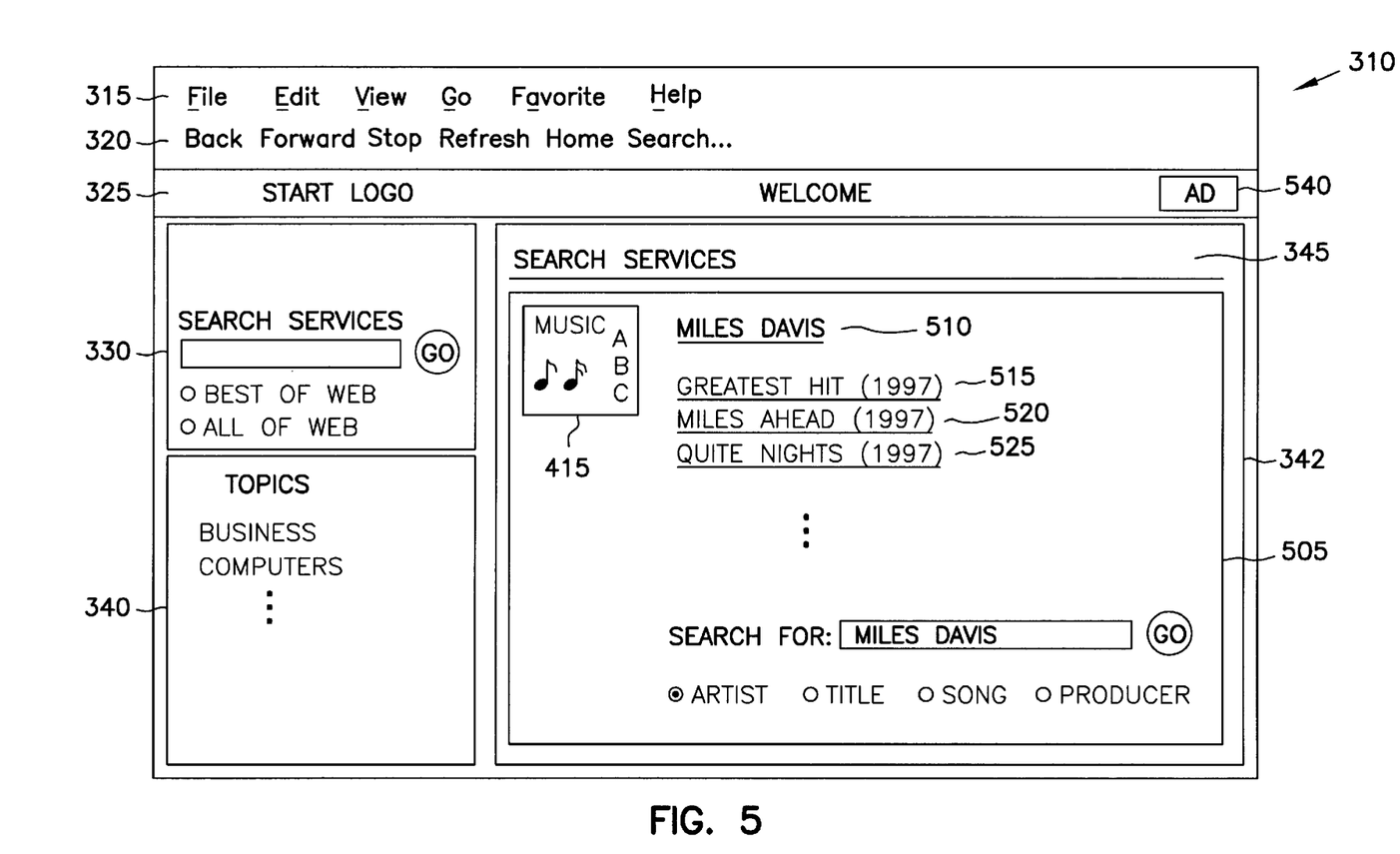
FIG. 5 is a block representation of the portal web page of FIG. 3 with a frame displaying the results of the search.

FIG. 5 represents the portal page after a user has entered a search for the artist Miles Davis. A frame or graphic 505 contains information generated by the content host related to the search clip request. In one embodiment, the format is very similar to the search clip in that the logo 415 is similarly positioned. Further, the artist is listed at 510 followed by a title of a first album or song at 515 The title may also serve as a link to reviews and the ability to order the album. Further albums are also listed at 530 with similar links as in the first album. Other frames, such as those containing advertising at 540 are still visible if desired.

The results frame is in line with the search services list. The entire area or frame is devoted to listing albums by Miles Davis. By clicking on another search clip, the process is repeated, this time obtaining information provided by the content provider that the clip is designed to interface with. The search clip comprises html, CDF, XML or other means of defining content to a browser. It carries information about its dimension—how big, how tall and how wide. It also contains information on how often it needs to be updated in the case of a weather forecast or stock quote.

A search clip can include a standard (HTML 3.2 or higher) form for submitting (via GET or POST) a search to the search provider (e.g., 225, the content host, of FIG. 2). Optionally, the search clip includes Java Script, VB Script or hosts Active X controls or Java Applets. Optionally, the search clip supports DHTML. The database of search clips (220 of FIG. 2) include a sample of test queries per search clip together with expected results in one embodiment. These query/results combinations are included in a semi-automated test script that checks periodically (weekly, perhaps daily) to make sure the query syntax used in the search clip (via GET or POST) is still supported by the search provider (225). This test script is also used to verify that response time and reliability (% success rate of queries via the search clip) are within acceptable limits. Where the underlying web-based search service does not support a particular search syntax of the search clip, the search syntax is translated in one embodiment based on a predetermined set of search rules and a predetermined set of requirements of the web-based search service. The search is then executed on the web-based search service, with results returned to the portal host. The portal host generates the appropriate tag based text for display of the results by a browser on the client such that it appears in a portal page frame. In one embodiment, the search clips are written by the owners of the portal host system 215. In a further embodiment, the search clips are written by the search provider 225, and comply with desired user interface guidelines propagated by the host system 215 owner.

Further search clips may be provided for other topics of general or special interest. Search clips for wine, flowers, movies, take out food establishments and other may be easily provided. By performing multiple beginning searches with just a single word, an entire evening may be planned without leaving the portal page. A portal thus becomes an entry point into the Internet and all the constellation of web centered services that are available. It includes e-mil, scheduling, buddy lists, bill paying and financial planning to name just a few. The use of search clips allows a user to get things done more quickly as will be described below in further detail. In essence, the complexity of navigating a hierarchical arrangement of web sites is greatly simplified. The portal web site performs much more like an application and less like a sequence of disjoint web pages. The need for navigational forward and backward buttons is greatly decreased.

Search clips provide a fast, content-specific way to focus a search. In one embodiment, the same rules apply at all levels for searching & browsing as well as the same or similar search features. In one embodiment, even the same minimal set of rules for ordering and return policy apply.

Search clips expose useful content-specific information that is currently hidden from most web search services. Users find and do a wide range of useful things without ever leaving the portal page. Use of ActiveX control makes things even more application-like, not just a disconnected series of web pages. Common rules and a consistent UI framework apply in one embodiment regardless of the search. In one embodiment, a portal page having a search mechanism utilizing search clips comprises a portal left-hand side bar provides easy access to common portal areas like Email. The top of the page contains the a logo and exposes generic activities like "help" & "customize". Results are formatted and displayed according to consistent rules, regardless of where the user is (e.g., top-level vs. search for specific albums by Miles Davis).

Topic search clips address the most common top-level user interests such as: games; free; video; chats; download; computer; jobs; music; freeware; maps; etc. A reasonable guess for "music" as an initial user query is that the user is looking for a CD. So first come references to search clips for service providers that help the user to do just that. As a "hedge" against cases where the top results are the wrong guess, dropdown menus are provided to enable the user select a kind of music (jazz, classical, . . . ), a kind of musical instrument (piano, violin, . . . ), an artist, etc.

Concepts map user words and phrases to topics to support a pseudo-natural-language verb/object stile of querying. These include phrases like buy a car, car buying, rent a car, rent a house, or re-model a house. For each concept, there is an associated list of alternative ways to express the concept.

Some examples are shown in Table 1:

TABLE 1

| | Variations |
|---|---|
| Verbs | |
| Buy | Buy; buying; buys; purchase; purchasing; get a good deal on . . . |
| Sell | Sell; selling; . . . |
| Select | Select; choose; decide on; . . . |
| Objects | |
| Car | Car; Cars; Automobile; Automobiles; Auto; Autos; . . . |
| House | House; home; |
| College | College; universi;ty; . . . |

Variations include common stem variations (only the ones users type in frequently, not all); common synonyms and even common misspellings. The list includes the words mostly commonly used; it does not have to be "complete".

Topics are tagged by concepts in one embodiment. For example, a topic "Select a college or university" would be tagged by the verb "select" and the object "college". The focus is on "basic concepts" that are used most frequently in our everyday lives. Example: Tag for "cars" or "trucks" but not for "vehicles".

Concepts are used to express the values of various attributes. In addition to the object and verb attributes, tagging may be done for information type ("magazines", "reviews", "chats", "user groups", . . . ); organization type ("companies", "museums", "libraries", . . . ); location-region (North America, Europe); location-country (United States; German; . . . ); location-state (Kansas; Alberta; Bavaria); location-city (St. Petersberg, Miami . . . )

There are further variations in which results are displayed. In one embodiment, display provider search clips are first shown. Ordering of search clips would need to be counterbalanced across searches. The second type of search result to be displayed is subtopics or qualifying questions. Rather than forcing users to click through a series of subcategories (Music:Genres:Jazz:Acid Jazz . . . ) more choices are represented via dropdowns, checkboxes, radio buttons and entry boxes (To look for a kind of music like <jazz, rock, . . . >click here)

Other matching reviewed sites are displayed next. Finally, if there are not enough search clips, subtopics, or reviewed sites to meet the user's request,the query is routed to a search engine for an all of the web query, usually resulting in thousands of hits being found for display, some of which might be relevant.

Conclusion.

Search clips provide a fast, easy way to do very targeted searches in a particular area. Each search clip is specialized for a particular type of search. For example, a Search Clip to search for a wine may have fields for type of wine, region, price, vintage and year-to-drink. A search clip for music may have fields for artist, album and type of music. A search clip for a phone number may have fields for first name, last name and city. The results page user interface of a search clip will also vary depending on the area/type. Whereas, it would not make sense for a general purpose web search user interface to have such fields.

Search clips are consistent with one another and with the overall search UI of the portal page. In one embodiment, all search clips have the same type of radio buttons, dropdown menus combo boxes and edit boxes. The provider logo and a hyperlink to the main site of the provider will have the same dimension and location in all search clips. Although search clips and results fields of search clips vary by area, all search clips obey common rules of search user interfaces. All search clips support the same rules of searching. For example, all clips support the use of phrase searching, wildcards, and the +/− operators.

Search clips are themselves searchable and easy to find. Search clips are tagged by keywords that users commonly use. For example, a search clip for a music provider would be tagged with the keyword "music" and "CDs". In one embodiment, search clips are also given a special "Search Clip" tag to insure that they appear first in a list of search results.

Search clips appear as ordinary results and, in one embodiment, appear at the beginning of the search results page. Users do not have to hunt in a sidebar for references to relevant clips.

The results of a search clip appear "in-place" within the search page on the portal site. The user can quickly go on to do another search without having to do a "back." This makes it easier for users to jump from one kind of search to another (for example, from a search for music CDs to a search for wines). This also makes it easy for users to jump to a different kind of activity altogether (for example, read e-mail, chat session, see the latest news headlines . . . ) Thus, the information comes to the user, rather than the user having to jump to the information.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of accessing web-based search services, the method comprising:
   receiving keywords specified by a user;
   comparing the keywords to a plurality of tags identifying predetermined search clips for one or more web-based search services, wherein the search clips provide access to and a user-interface for the web-based search services;
   displaying, on a browser page, a list of hyperlinks to search clips that match the keyword;
   receiving a selection from the user wherein the selection indicates one of the hyperlinks to the search clips;
   displaying on the browser page a label and an insert field wherein the label is customized based on a type of search clip;
   receiving a search criteria from the user related to the label displayed;
   translating the search criteria based on a predetermined set of search rules and a predetermined set of requirements of the web-based search service;
   executing a search on the web-based search service; and
   displaying a result of the search on the browser page.

2. A computer readable medium having instructions stored thereon for causing a computer to perform the method of claim 1.

3. A computer readable medium having stored thereon a data structure comprising:
   a first data field containing data representing a search clip for allowing a user to specify criteria for a search to be executed by a web-based search service, wherein the search clip provides access to and a user-interface for the web-based search service; and
   a second data field containing data representing a tag for indexing the search clip represented by the first data field.

4. A method of generating a search results list for display on a website page comprising the steps of:
   receiving a search request which originates on a website page;
   retrieving a list of search clips, wherein the search clips provide access to and a user-interface for web-based search services and allow a user to specify criteria for a search to be executed by the web-based search services;
   searching for links to other websites; and
   causing display of a search results list having the list of search clips in place with a list of links to other websites that satisfy the search request.

5. The method of claim 4 and further comprising the step of placing the search clip list first in the search results list.

6. The method of claim 4 wherein the list of search clips and links to other websites are displayed in a frame located on the website page on which the search request originated.

7. The method of claim 4 wherein the list of search clips comprises links to a plurality of search clips having a common format.

8. The method of claim 7 wherein the format of the search clips comprise a logo representative of a provider of data to be searched, a text box, a go button, and at least one qualifier for the search.

9. The method of claim 4 wherein the list of search clips comprises links to a plurality of search clips, and wherein selection of a search clip causes display of it in a frame located on the website page on which the search request originated.

10. The method of claim 4 wherein the website page is a portal page having links to multiple topics.

11. The method of claim 4 wherein the list of search clips is retrieved from a database having tags associated with the search clips.

12. The method of claim 11 wherein the tags comprise generic words most likely to be used by users looking for topics of interest.

13. A computer readable medium having instructions stored thereon for causing a computer to perform the method of claim 4.

14. The method of claim 4 wherein the display of the results list is generated from a tag based language.

15. A computer readable medium having computer-executable instruction for performing a method of accessing web-based search services, the method comprising:
   receiving keywords specified by a user;
   comparing the keywords to a plurality of tags identifying predetermined search clips for one or more web-based search services, wherein the search clips provide access to and a user-interface for the web-based search services;
   displaying, on a browser page, a list of hyperlinks to search clips that match the keyword;
   receiving a selection from the user wherein the selection indicates one of the hyperlinks to the search clips;
   displaying on the browser page a label and an insert field wherein the label is customized based on a type of search clip;
   receiving a search criteria from the user related to the label displayed;
   translating the search criteria based on a predetermined set of search rules and a predetermined set of requirements of the web-based search service;
   executing a search on the web-based search service; and
   displaying a result of the search on the browser page.

16. A computer readable medium having computer-executable instruction for performing a method of generating a search results list for display on a website page comprising the steps of:
   receiving a search request which originates on a website page;
   retrieving a list of search clips, wherein the search clips provide access to and a user-interface for web-based search services and allow a user to specify criteria for a search to be executed by the web-based search services;
   searching for links to other websites; and
   causing display of a search results list having the list of search clips in place with a list of links to other websites that satisfy the search request.

17. A system for generating a portal page, the system comprising:
   a portal host that provides tag based display material in the form of a portal page to attached clients;
   a database coupled to the host that contains records corresponding to search clips and links to web pages, wherein the search clips provide access to and a user-interface for web-based search services and allow a user to specify criteria for a search to be executed by the web-based search services; and
   a page generation module coupled to the database that receives information from the portal host corresponding to common user interests and generates a frame for display of such information on the portal page and also receives a list of search clips from the database and generates a frame for display of the list of search clips on the portal page.

18. The system of claim 17 wherein links to web pages are included in the frame containing the list of search clips.

19. The system of claim 18 wherein the list of search clips is positioned in such frame prior to the links to web pages.

20. The system of claim 17 wherein the page generation module further generates a frame for a user on a client to enter a general search request on the portal page.

21. The system of claim 20 wherein the page generation module further generates a frame containing a list of common topics of interest for display on the portal page.

* * * * *

UNITED STATES PATENT AND TRADEMARK OFFICE
CERTIFICATE OF CORRECTION

PATENT NO.   : 6,256,623 B1
DATED         : July 3, 2001
INVENTOR(S)  : William P. Jones It is certified that error appears in the above-identified patent and that said Letters Patent is hereby corrected as shown below:

Column 1,
Line 49, insert -- . -- after "searches";

Column 7,
Line 26, delete "The portal host system 215";

Column 9,
Line 7, insert -- . -- after "515";
Line 53, delete "other" and insert -- others -- therefor;
Line 58, delete "e-mil" insert -- e-mail -- therefor;

Column 10,
Line 14, insert -- , -- after "clips";
Line 14, insert -- and -- after "bar";
Line 16, delete th second ocurrence of -- the --;
Line 28, insert -- to -- after "user";
Line 53, delete "mostly" and insert -- most -- therefor;

Column 11,
Line 20, delete "Search Clip" and insert -- search clip --;
Line 32, insert -- , -- after "menus" and the first occurrence of "boxes".

Signed and Sealed this

Fifth Day of February, 2002

*Attest:*

JAMES E. ROGAN
*Director of the United States Patent and Trademark Office*

*Attesting Officer*